United States Patent
Yi

(10) Patent No.: US 12,549,839 B2
(45) Date of Patent: Feb. 10, 2026

(54) LENS MODULE WITH REDUCED HEIGHT AND ELECTRONIC DEVICE HAVING THE SAME

(71) Applicant: TRIPLE WIN TECHNOLOGY(SHENZHEN) CO.LTD., Shenzhen (CN)

(72) Inventor: Wen-Jie Yi, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 354 days.

(21) Appl. No.: 18/070,355

(22) Filed: Nov. 28, 2022

(65) Prior Publication Data

US 2024/0142859 A1  May 2, 2024

(30) Foreign Application Priority Data

Oct. 28, 2022 (CN) .......................... 202211338807.7

(51) Int. Cl.
*H04N 23/55* (2023.01)
(52) U.S. Cl.
CPC .................................. *H04N 23/55* (2023.01)
(58) Field of Classification Search
CPC .... G03B 17/561; H04N 23/55; H04N 5/2253; H01L 27/14618

USPC .......................................................... 348/374
See application file for complete search history.

(56) References Cited

U.S. PATENT DOCUMENTS

| | | | |
|---|---|---|---|
| 2011/0205424 A1* | 8/2011 | Nakashima | G02B 7/08 |
| | | | 359/823 |
| 2014/0049686 A1* | 2/2014 | Chen | H01L 27/14618 |
| | | | 348/374 |
| 2019/0349507 A1* | 11/2019 | Lee | H04N 23/54 |
| 2022/0093673 A1* | 3/2022 | Do | H05K 3/4007 |
| 2022/0256065 A1* | 8/2022 | Minamisawa | H04N 23/685 |
| 2023/0194829 A1* | 6/2023 | Chen | G02B 7/04 |
| | | | 359/822 |

FOREIGN PATENT DOCUMENTS

| | | |
|---|---|---|
| CN | 111787202 | 10/2020 |
| CN | 113552682 | 10/2021 |

\* cited by examiner

*Primary Examiner* — Xi Wang
(74) *Attorney, Agent, or Firm* — ScienBiziP, P.C.

(57) ABSTRACT

A lens module with reduced height, and an electronic device carrying it, includes a lens assembly, a printed circuit board, a filter, and a photosensitive chip. The first and second opposing surfaces of the printed circuit board are each grooved to respectively hold the filter and the photosensitive chip. The existence of the first and second grooves enables a significant reduction to be made in the total height of the lens module. Moreover, the lens module adopts the FC packaging structure, not requiring a bracket, to further reduce the volume of the lens module.

2 Claims, 4 Drawing Sheets

LENS MODULE WITH REDUCED HEIGHT AND ELECTRONIC DEVICE HAVING THE SAME

FIELD

The subject matter herein generally relates to optical devices, and more particularly, to a lens module and an electronic device having the lens module.

BACKGROUND

Lens modules are mainly packed by packaging processes such as Chip Scale Package (CSP), Chip on Board (COB), and Flip Chip (FC).

CSP bonds a wafer-level glass with a wafer, and uses cofferdams to separate the image sensor from the chip of the wafer, makes a ball grid array (BGA) after forming the circuit on the back of the wafer, then cuts the aforementioned structure to form an image sensor unit with a single sealed cavity. A module assembly structure through Surface Mounting Technology (SMT) is finally formed. COB bonds the back of the chip to the pad of the printed circuit board (PCB) with metal wires, and then installs a bracket and lens onto the PCB to form an assembled module structure. FC connects the chip pads (or metal bumps) and PCB pads in one process through thermosonic process to form a packaging structure, and then uses the SMT method to form a module assembly structure through the pad or solder ball on the outside of the PCB.

Among the above packaging processes, the FC packaging process can obtain the lens module with lowest height and best signal transmission quality. However, as the electronic products become thinner and lighter, the height of the lens module (3.86 mm) remains relatively high and does not meet the demands.

Therefore, there is room for improvement in the art.

BRIEF DESCRIPTION OF THE DRAWINGS

Implementations of the present disclosure will now be described, by way of embodiments only, with reference to the attached figures.

DETAILED DESCRIPTION

Figure 1:
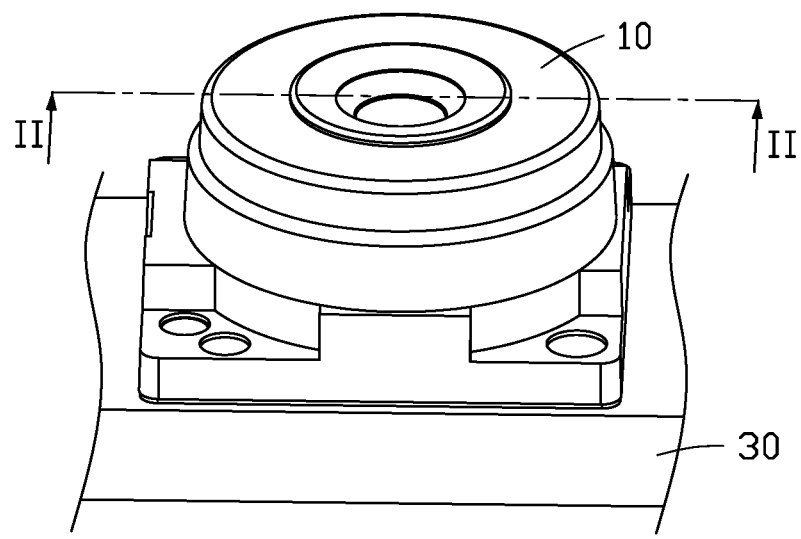
FIG. 1 is a diagrammatic view of a lens module according to an embodiment of the present disclosure.

Unless otherwise defined, all technical and scientific terms used herein have the same meaning as commonly understood by persons skill in the art. The terms used herein are only for the purpose of describing specific embodiments, and not intended to limit the embodiments of the present application.

It should be noted that all directional indications (such as up, down, left, right, front, back, etc.) in the embodiments of the present application are only used to explain the relative positional relationship or movement between various components under a certain posture (as shown in the drawings). If the specific posture changes, the directional indication may also change.

In this application, descriptions such as "first", "second" etc. are only used for description purposes and should not be understood as indicating or implying their relative importance or implying the number of indicated technical features. Thus, a feature defined as "first" and "second" may expressly or implicitly include at least one of that feature. In the description of the present application, "plurality" means more than one unless expressly and specifically defined otherwise.

The embodiments of the present application are described here with reference to sectional views, which are schematic diagrams of idealized embodiments (and intermediate structures) of the present application. Therefore, there may be differences in the shapes of the drawing due to the manufacturing process and/or tolerance of the actual physical device or structure. Accordingly, the embodiments of the present application should not be interpreted as limited to the specific shape of the area illustrated here, but should include, for example, deviation of shape due to manufacturing. The areas shown in the drawings are only schematic, and their shape is not used to illustrate the actual shape of the device, and is not used to limit the scope of the present disclosure.

Some embodiments of the present application will be described in detail below with reference to the drawings. The following embodiments and features of the embodiments may be combined with each other in the absence of conflict.

Figure 2:
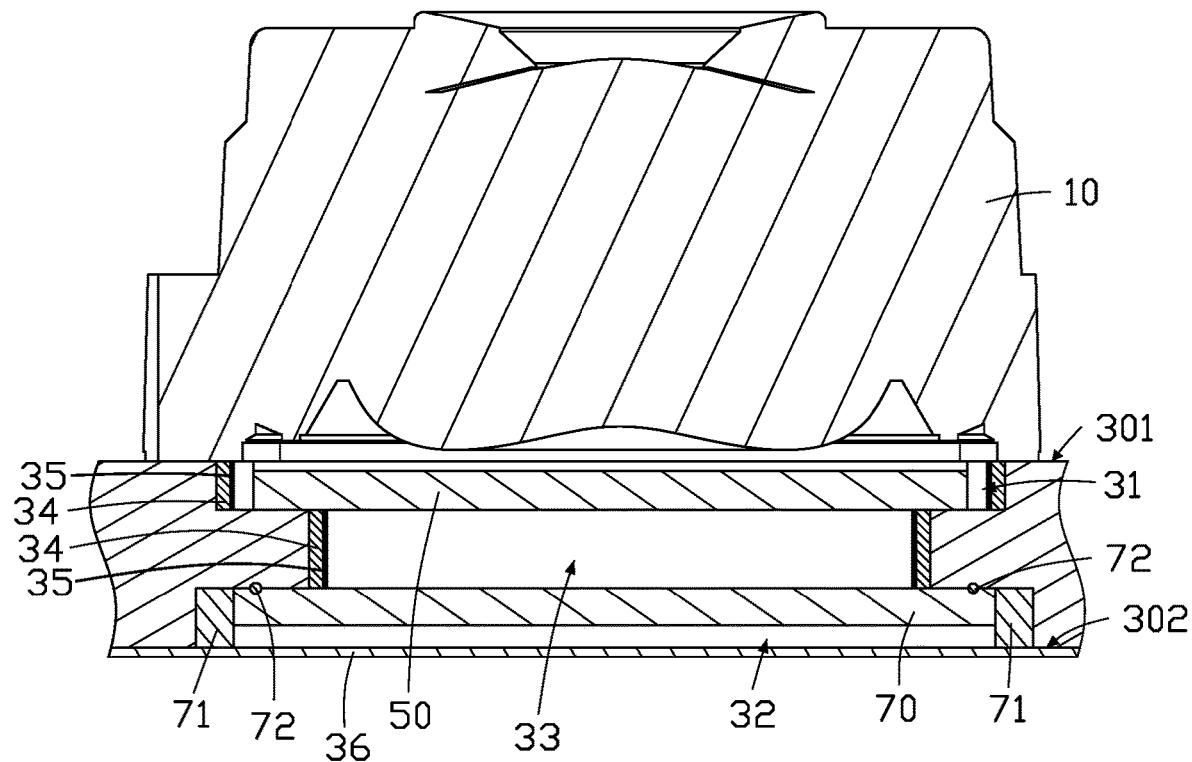
FIG. 2 is a cross-sectional view along II-II of FIG. 1.

Referring to FIGS. 1 and 2, an embodiment of the present application provides a lens module 100. The lens module 100 includes a lens assembly 10, a printed circuit board 30, a filter 50, and a photosensitive chip 70.

The printed circuit board 30 includes a first surface 301 and a second surface 302 opposite to each other, and the lens assembly 10 is arranged on the first surface 301. A portion of the first surface 301 is recessed toward the second surface 302 to form a first groove 31, and a portion of the second surface 302 is recessed toward the first surface 301 to form a second groove 32. A portion of a bottom surface of the first groove 31 is further recessed toward a bottom surface of the second groove 32 to form a through hole 33. The first groove 31 and the second groove 32 communicates with each other by the through hole 33. The first groove 31, the second groove 32, and the through hole 33 can be formed by, but not limited to, laser beams or mechanical drilling. Orthographic projection of the lens assembly 10 completely covers the first groove 31 or the second groove 32. The filter 50 is an optical component allowing permitted light only to pass through. The filter 50 is disposed on the bottom surface of the first groove 31, and the photosensitive chip 70 is disposed on the bottom surface of the second groove 32. The filter 50 faces the photosensitive chip 70, and the filter 50 and the photosensitive chip 70 cover both ends of the through hole 33.

In the lens module 100 of the present disclosure, the first groove 31 and the second groove 32 are provided on the printed circuit board 30 to accommodate the filter 50 and the photosensitive chip 70 respectively, so that the total height of the lens module 100 is reduced.

In some embodiments, as shown in FIG. 2, a conductor layer 34 is provided on inner walls of the first groove 31 and the through hole 33. The material of the conductive layer 34 can be but is not limited to copper. The copper layer may be formed by a plated-through-hole (PTH) process, that is, a layer of copper is deposited on the inner walls of the first groove 31 and the through hole 33 by chemical means. The copper layer may be electrically connected to the printed circuit board 30.

Furthermore, a matte ink layer 35 may be provided on a surface of the conductor layer 34. The surface of the matte ink layer 35 has a nano-particle structure, the matte ink layer 35 has the characteristics of repelling dirt and dust and is easy to clean (similar to the super-hydrophobic characteristic of a lotus leaf), which reduces pollution by foreign matter such as dirt and dust, on the photosensitive chip 70, thereby improving anti-fouling and dust-proofing of the lens module 100.

In some embodiments, as shown in FIG. 2, an adhesive layer 71 is disposed between the photosensitive chip 70 and an inner sidewall of the second groove 32. The adhesive layer 71 may be made of, but not limited to, a thermosetting adhesive. The adhesive layer 71 can increase the adhesion between the photosensitive chip 70 and the second groove 32, so that the photosensitive chip 70 can be disposed firmly and stably in the second groove 32.

In this embodiment, the photosensitive chip 70 is a flip chip. As shown in FIG. 2, the photosensitive chip 70 includes bumps 72 disposed on a surface of the photosensitive chip 70 facing the through hole 33. The bumps 72 may be made of metal or other conductive materials, and are electrically connected to the pads (not shown) of the printed circuit board 30 through thermosonic process. That is, the lens module 100 in the present disclosure has an FC package structure. The bumps 72 may be, but are not limited to ring-shaped. The lens module 100 of the present disclosure adopts an FC package structure, which does not require a bracket, unlike the COB package, and the volume of the lens module 100 is thus reduced.

In some embodiments, the filter 50 is an infrared-blocking filter, and is used to filter out infrared lights to ensure image quality. The filter 50 may be disposed in the first groove 31 through a bonding layer (not shown), and the bonding layer may be of reinforcing resin. The reinforcing resin may be UV curable reinforcing resin, and may also be mixed with carbon black, or other pigment or agent, so as to improve the strength and stability of the filter 50 disposed in the first groove 31. In other embodiments, the filter 50 may also be directly disposed in the first groove 31 without the bonding layer.

In some embodiments, as shown in FIG. 2, a conductive glue layer 36 is provided on the second surface 302 of the printed circuit board 30. The conductive glue layer 36 may be used for bonding and for electrically connecting the lens module 100 with external components.

In some embodiments, the printed circuit board 30 includes one or several conductive circuit layers. The printed circuit board 30 may include multiple conductive circuit layers and multiple dielectric layers (insulation layers), and each dielectric layer is arranged between two conductive circuit layers adjacently disposed. A conductive structure is formed in each dielectric layer, and two conductive circuit layers adjacently disposed are electrically connected to each other through the conductive structure. In this embodiment, the printed circuit board 30 has 10 layers of the conductive circuit layer.

Figure 3:
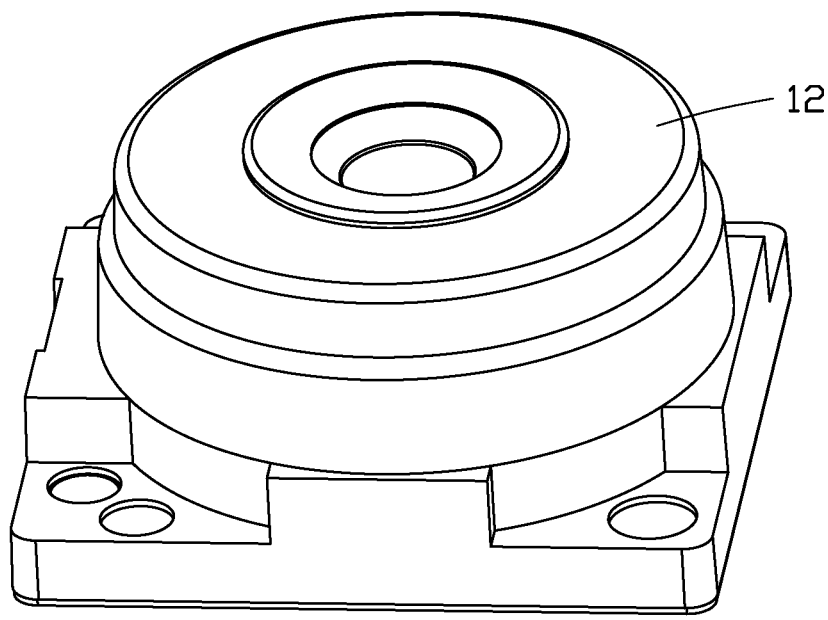
FIG. 3 is an exploded view of a lens assembly of the lens module of FIG. 1.
Figure 3:
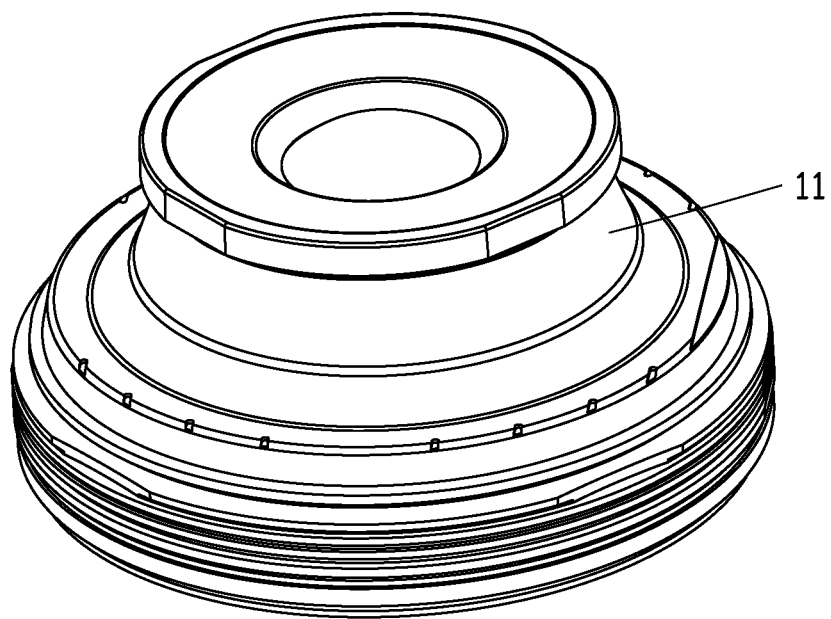

In some embodiments, as shown in FIG. 3, the lens assembly 10 includes a lens unit 11 and a lens barrel 12 for accommodating the lens unit 11. The filter 50 (referring to FIG. 2) is located on an optical path of the lens unit 11. The lens unit 11 may be composed of a single lens or multiple coaxial lenses. When the lens unit 11 is composed of multiple lenses, the diameters of each lens may be the same or different.

In this embodiment, the height of the lens module 100 is 3.46 mm. In some embodiments, the height of the lens assembly 10 is 2.36 mm to 2.46 mm. Optionally, the height of the lens assembly 10 is 2.41 mm. In some embodiments, the height (thickness) of the printed circuit board 30 is 1.5 mm to 2.0 mm. Optionally, the height of the printed circuit board 30 is 1.0 mm. Optionally, the thickness of the conductive glue 36 is 0.05 mm.

Figure 4:
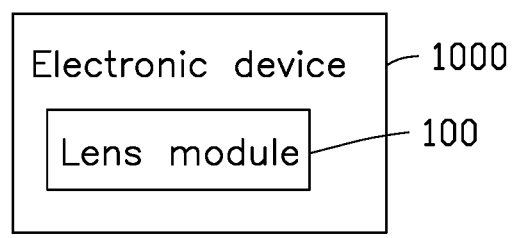
FIG. 4 is a diagrammatic view of an electronic device according to an embodiment of the present disclosure.

Referring to FIG. 4, the present application also provides an electronic device including the above-mentioned lens module 100. The lens module 100 can be applied in various electronic devices 1000, such as mobile phones, notebook computers, wearable devices, vehicles, digital cameras, monitoring devices, and so on.

In the lens module 100 and the electronic device 1000 of the present application, the first groove 31 and the second groove 32 are provided on the printed circuit board 30 to accommodate the filter 50 and the photosensitive chip 70 respectively, so that the total height of the lens module 100 can be reduced. Moreover, the lens module 100 of the present application adopts the FC packaging structure, which does not require a bracket compared with the COB package, and can further reduce the volume of the lens module 100. In addition, the matte ink layer 35 is provided on the inner wall of the first groove 31 and the through hole 33, and functions to reduce pollution by foreign matter, such as dirt and dust, of the photosensitive chip 70, thereby improving the anti-fouling and dust-proof effect inside the lens module 100.

The above descriptions are some specific embodiments of the present application, but the actual application process cannot be limited only to these embodiments. For those of ordinary skill in the art, other modifications and changes made according to the technical concept of the present application should all belong to the protection scope of the present application.

What is claimed is:

1. A lens module comprising:
   a lens assembly;
   a printed circuit board comprising a first surface and a second surface opposite to the first surface in a thickness direction of the printed circuit board, the lens assembly arranged on the first surface, the first surface partially recessed toward the second surface to form a first groove, the second surface partially recessed toward the first surface to form a second groove, and the first groove and the second groove communicated with each other through a through hole, and the first groove, the through hole, and the second groove being arranged along the thickness direction of the printed circuit board;
   a filter arranged on a bottom of the first groove;
   a conductor layer formed on inner walls of the first groove and the through hole;
   a matte ink layer formed on a surface of the conductor layer away from the inner walls; and
   a photosensitive chip arranged on a bottom of the second groove, wherein the filter and the photosensitive chip cover both ends of the through hole.

2. An electronic device comprising:
   a lens module, the lens module comprising:
      a lens assembly;
      a printed circuit board comprising a first surface and a second surface opposite to the first surface in a thickness direction of the printed circuit board, the lens assembly arranged on the first surface, the first surface partially recessed toward the second surface to form a first groove, the second surface partially recessed toward the first surface to form a second groove, and the first groove and the second groove are communicated with each other through a through hole, and the first groove, the through hole, and the second groove being arranged along the thickness direction of the printed circuit board;

a filter arranged on a bottom of the first groove;

a conductor layer on inner walls of the first groove and the through hole;

a matte ink layer on a surface of the conductor layer away from the inner walls; and a photosensitive chip arranged on a bottom of the second groove, wherein the filter and the photosensitive chip cover both ends of the through hole.

\* \* \* \* \*